United States Patent [19]

Picken

[11] Patent Number: 4,643,933
[45] Date of Patent: Feb. 17, 1987

[54] HOLLOW CORE SANDWICH STRUCTURES
[75] Inventor: Harry B. Picken, Ridgeway, Canada
[73] Assignee: Genaire Limited, St. Catharines, Canada
[21] Appl. No.: 739,323
[22] Filed: May 30, 1985
[51] Int. Cl.⁴ ............................ B32B 3/12; B32B 3/28
[52] U.S. Cl. ...................................... 428/116; 52/799; 52/800; 52/806; 428/119; 428/178; 428/186; 428/593; 428/615
[58] Field of Search ............... 428/116, 118, 119, 120, 428/186, 166, 172, 178, 592–595, 603, 615; 108/51.1; 52/799, 800, 806

[56] References Cited

U.S. PATENT DOCUMENTS

| | | | |
|---|---|---|---|
| 2,634,361 | 4/1953 | Reynolds | 428/116 |
| 3,017,971 | 1/1962 | Christman | 428/118 |
| 3,556,917 | 1/1971 | Eakin et al. | 428/118 |
| 3,709,161 | 1/1973 | Kauffman | 108/51.1 |
| 4,254,188 | 3/1981 | Campbell et al. | 428/116 |

Primary Examiner—Paul J. Thibodeau
Attorney, Agent, or Firm—Weldon F. Green

[57] ABSTRACT

In a composite support structure such as a pallet wherein spaced apart opposed structural sheets are separated by a central core, the core including a plurality of spaced apart elongated channel-shaped members each presenting their longitudinally extending flange formations to the sheets and having longitudinally extending corrugated structural strips disposed between adjacent pairs of the channel-shaped members, each corrugated strip presenting alternate ridge segments thereof to each of adjacent pairs of the channel-shaped members and in abutment therewith with fasteners or the like securing each channel-shaped member to each corrugated strip formation in the regions of abutment.

20 Claims, 4 Drawing Figures

HOLLOW CORE SANDWICH STRUCTURES

FIELD OF INVENTION

This invention relates to improvements in composite panel-like support structures required to have considerable strength and stiffness or rigidity, yet of relatively light weight.

Essentially, such structures comprise an extended central flat-lying core bounded by a perimetral edge formation and by an upper sheet or skin and a lower sheet or skin all suitably secured together in a unitary sandwich like arrangement.

More particularly this proposal is directed to an improved lightweight core for such load bearing sandwich structures which core is substantially hollow yet possessing sufficient strength and stiffness or rigidity adequate for use in the construction of load bearing pallets, base panels or vehicles, aircraft or other equipment where low weight is an important factor.

BACKGROUND TO THE INVENTION

Hollow core sandwich structures to which this invention is directed must be resistant to compression over a wide range of applied loads.

More particularly the upper sheet or skin and lower sheet or skin for such core must resist relatively great tensile and compressive forces with the core serving to stabilize the sheets or skins on those surfaces where they must act most efficiently.

The required degree of stiffness and resistance to bending and buckling and the light weight of the hollow core sandwich structure will encourage if not dictate use of such an alternative, for example in pallets where heavy loads of material or supplies or a heavy vehicle or equipment are to be transported by truck, rail or by air, weight being a significant factor in shipment costs and therefore to be minimized where possible.

One widely used core structure for pallets is balsa wood.

Balsa is lightweight and capable of accommodating heavy loads quite satisfactorily where the load is applied to the end grain.

So long as balsa is readily available and the cost reasonable, likely it will continue to be specified as core material for certain applications in the construction of pallets, base panels and other like circumstances.

Where a pallet with a balsa core is not watertight and the core becomes saturated with water and not relieved or remedied, rot sets in and the core deteriorates and no longer can the pallet handle compressive loads. Such pallet must either be repaired or rejected.

Further, with balsa cores delamination of the upper and lower sheets or skins occurs. This tendency is attributable in part to the several different coefficients of expansion, that is of the balsa itself, the metal or alloy used for the sheets or skins and the metal or alloy used in the edge formation or frame surrounding the core as well as in the adhesive used to secure or bond the components together.

Delamination in pallets using a balsa core between the top and bottom skin is a serious problem and requires frequent repair.

On the other hand a variety of low density or hollow cellular core structures have been proposed for numerous applications including pallet structures, base panels for containers and for aircraft wings.

The hollow honeycomb core configuration is common to many proposals such as appears from the pallet structure of U.S. Pat. No. 3,709,161 wherein the core is fabricated from double-faced corrugated paperboard using adhesive to bond the components together.

Alternatively, several honeycomb configurations derived from sheet units of resin impregnated glass wool are illustrated and described in U.S. Pat. No. 4,500,583.

Low density hollow metallic cores for panels that utilize a honeycomb core configuration manufactured from strip material also have been developed such as in U.S. Pat. No. 2,959,257 wherein stainless steel core strips are recommended and the composite secured to the surface sheets or skins by welding.

U.S. Pat. No. 3,017,971 likewise discloses a composite honeycomb core structure derived from corrugated metal strips to be secured by brazing, whereas in U.S. Pat. No. 3,604,374 a panel for blast protection utilizes corrugated core strips derived from steel secured to armoured steel plates by suitable adhesives.

Modified honeycomb structures serving as cores in laminated aircraft wings are revealed by U.S. Pat. No. 1,578,416 and by U.S. Pat. No. 2,720,949 each utilizing metallic strips so folded or configured as to present mating halves of hollow cells of hexagonal configuration combined with reinforcing longitudinal divider strips or ribs utilizing thermosetting adhesives or other suitable bonding agents for securing adjoining surfaces together.

A more complex combination of high density and low density honeycomb cores provided with solid spars and spar caps respectively extending spanwise of the high density core portion to serve as a strengthening or reinforcing member in airplane control surfaces such as a flap or an aileron is described in U.S. Pat. No. 4,304,376.

This structure utilizes liquid bonding adhesives to secure the core combination to the skin, requiring that the improved core components including the spar caps be precisely dimensioned before the application of the adhesive in order to avoid a rippling effect in the skin due to the character and migration of the adhesive upon curing which would adversely affect the aerodynamic properties of the airplane control surfaces.

OBJECTS OF THE INVENTION

It is a principal object of this invention therefore to provide an improved simplified hollow core sandwich structure of considerable strength and stiffness or rigidity suitable for withstanding substantial bending and shear forces.

More particularly it is an object of this invention to provide an improved hollow modified honeycomb core structure for pallets of relatively light weight yet capable of imparting sufficient strength characteristics to the composite structure at least equal to or exceeding those now produced and in use in commercial undertakings or by the military and capable of handling maximum specified loads.

Still another very important object of this invention is to provide an improved hollow modified honeycomb core structure fabricated from readily available materials using a minimum number of parts, formed into the requisite shapes with conventional equipment, easily assembled and readily secured or bonded together using available fasteners and known techniques so as to improve efficiency and save costs in production.

Another important object is to provide a composite sandwich structure which resists delamination as well as deformation imparted by rollers or balls or conventional loading systems when the sandwich structure is utilized as a pallet or a base panel in containers thereby prolonging its useful life.

FEATURES OF THE INVENTION

One feature of this invention resides in providing a composite structure wherein opposed spaced apart structural sheets are joined against separation by a central core including the combination of at least a pair of spaced apart elongated structural members interconnected by a longitudinally extending corrugated strip formation extending intermediately therebetween, the structural members having a central web portion and presenting opposed longitudinally extending flange formations to each of the spaced apart structural sheets and with the corrugated strip formation presenting alternate ridge segments thereof to the respective web portions of each adjacent structural member and in abutment therewith, the structural members and corrugated strip formation being secured together in the regions of abutment.

More particularly, it is a feature of this invention to provide the elongated structural members in the form of channels so dimensioned that the area presented by the longitudinal extending flange formations thereof is sufficient for adequate adhesion of same to the respective structural sheets by suitable adhesives or bonding agents.

Still another feature of this invention resides in providing an adhesive or bonding material for securing the structural members to the respective structural sheets in strip form applicable to the remote flange surfaces of the channel-shaped elongated structural members only, limiting the requirement to scour and remove grease from those flange surfaces thereby decreasing the time required for preparing the core and accelerating the bonding and assembly steps.

Another feature of this invention resides in providing the intermediate elongated strip formations with a uniformly corrugated configuration which strip formations are disposed between adjacent elongated structural members in a manner such that alternate ridge segments of adjacent strip formations are arranged in opposed aligned abutting relation to the web formation of the elongated structural member separating them whereby a generally uniform modified honeycomb pattern is established throughout the extent of the core.

Still another important feature resides in selecting a suitable staple for securing the respective structural members and abutting opposed aligned ridge segments of the elongated strip formations against separation, such staple having the strength to penetrate through the channel web and ridge segments in the regions of abutment and clinched whereby the shear value established in respect of such joint equals that of every other joint and whereby total shear value between the interfaces in the regions of abutment may be uniformly increased and automatically established either by selecting a particular staple of greater cross-section and strength or by using staple multiples to achieve requisite values.

Still another feature of the invention resides in providing the components of the core from continuous strip material whereby the modified honeycomb structure derived therefrom in accordance with this invention can be fabricated so as to meet any required dimensions as to length, width and depth.

THE DRAWINGS

These and other objects and features will become apparent upon reading the following description in conjunction with the sheets of drawings in which FIG. 1 is a perspective exploded view of the principal components of a composite hollow core sandwich structure embodying the invention, the components being sectioned or broken away so as to reveal their respective structures connections and relationships;

FIG. 4 is a cross-sectional view of the principal components of the composite structure of FIGS. 1 and 2 in their interconnected relationship and broken away so as to better reveal their relative positions and proportions;

THE DESCRIPTION

Figure 1:
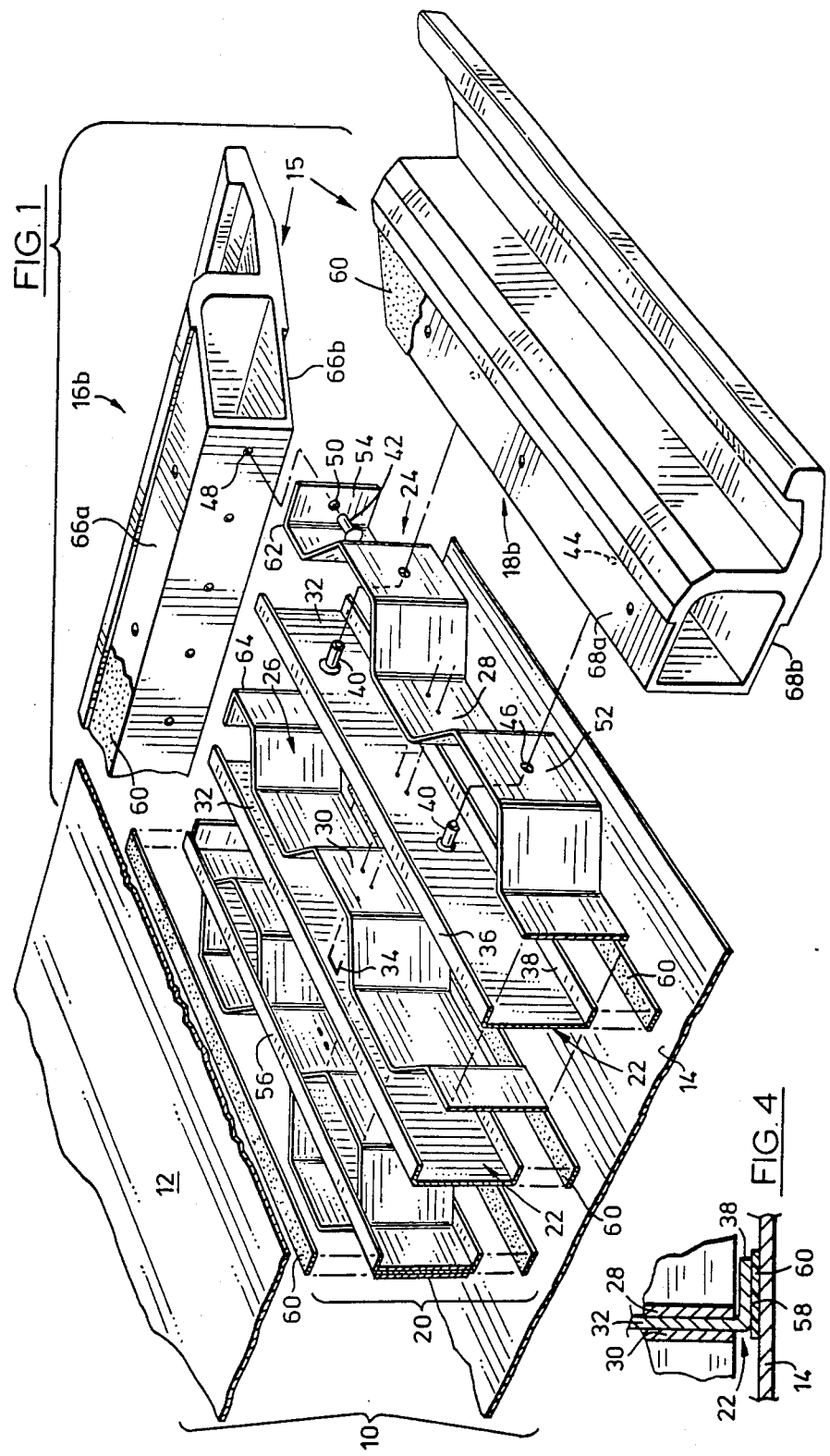

A composite panel structure 10 embodying the invention illustrated in FIGS. 1 to 4 of the drawings includes spaced apart structural sheets or skins 12 and 14 respectively and a frame 15 defined by side structural frame members 16a, 16b and end structural frame members 18a, 18b respectively enclosing a central core 20.

Central core 20 includes a plurality of elongated uniformly spaced apart structural members 22 of channel-shaped configuration, and a plurality of longitudinally extending corrugated structural strip formations 24 and 26 respectively disposed intermediately between adjacent structural members 22 and interconnected therewith in the regions of ridge segments 28, 30 thereof respectively as will be described.

Longitudinally extending strip formations 24, 26 are identical in the preferred embodiment but in their disposition intermediately between adjacent structural members 22 are reversed so that the ridge segments 28, 30 respectively are disposed in opposed aligned abutting relationship to the common web portion 32 of elongated structural member 22 separating them.

Common web portions 32 of structural members 22 and abutting ridge segments 28, 30 of elongated corrugated strip formations 24, 26 establish three layered joints.

Figure 2:
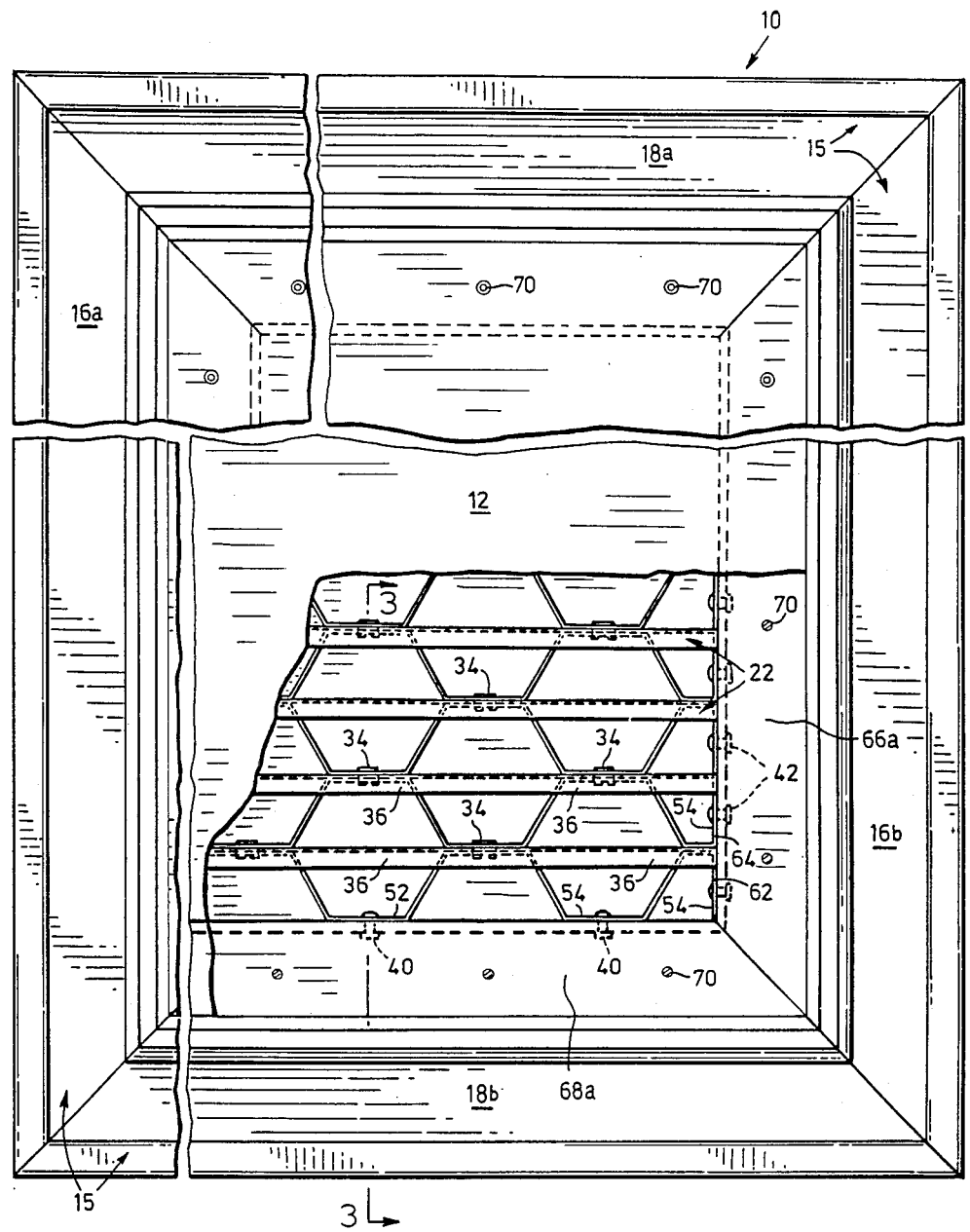
FIG. 2 is a plan view of the assembled composite hollow core sandwich structure of FIG. 1 with the structural sheet or skin on one surface and other components broken away to reveal the interconnected relationships of the components of the hollow core.
Figure 3:
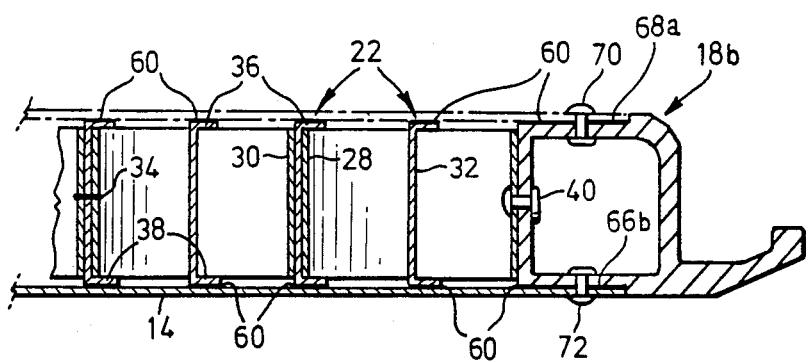
FIG. 3 is a sectional view of the composite sandwich structure illustrated in FIGS. 1 and 2 taken along the plane of line 3—3 of FIG. 2 with the remainder of the structure broken away.

According to the preferred embodiment of the invention suitable staples 34 are used to secure web portions 32 of members 22 and abutting ridge segments 28, 30 of strip formations 24, 26 together centrally of the three layered interfaces or regions of abutment to establish a strong joint as can be perceived from FIGS. 1 to 3 of the drawings.

It will be observed from FIG. 2 that with this arrangement of core components a modified honeycomb cell structure is provided wherein the two halves of the honeycomb cell are constituted by opposed ridge segments 38, 30 separated by elongated structural member or channel 22.

Such modified honeycomb core components, structural members 22 and corrugated strip formations 24, 26 are derived preferably from a continuous strip of appropriate material such as aluminum alloy 6061T6.

Where such aluminum strip material would be used staples 34 of a high strength steel can be supplied which can be driven easily through the three layered interfaces of web portions 32 and ridge segments 28, 30 of the strip formations 24, 26 and then clinched.

One important advantage of such technique is that the shear value of every joint established throughout the core is identical to that of every other joint.

Another advantage is the simplicity of the operation utilizing only selected staples and readily available portable air-driven stapling guns.

Moreover, because of the substantial area afforded by the interfaces in the regions of abutment, additional staples can easily be added to considerably increase the total shear value between those interfaces if required.

Further, it will be observed, taking one segment of the modified honeycomb core exhibiting one-half of the honeycomb or hexagon pattern presented by either corrugated strip formation 24 or 26 and the adjacent pair of structural members or channels 22 secured together by staples extending through each web 32 and alternate ridge segments 28 or 30 thereof that a simple beam structure is provided which will have a substantial moment of inertia with respect to its cross-section and thereby act to resist deformation.

Moreover, this proposal for the modified hollow honeycomb core structure allows for ready increase in the dimensions of the components, for example in the width of flanges 36, 38 and of the extent of web portion 32 between flanges 36, 38 of members or channels 22 as well as any increase or decrease in the material thicknesses of all or any of the components as may be required.

When bending loads are applied at 90° to the direction of the elongated structural members or channels 22 adequate resistance to bending will be observed owing to the depth of composite honeycomb core structure 20 notwithstanding that segments 28, 30 of strip formations 24, 26 are not provided with flanges at either edge, although such flanges are optional.

Central core 20 of composite sandwich structure 10 is secured to side frame members 16a, 16b and end frame members 18a, 18b of perimetral frame 15 by suitable blind rivets 40 and 42 extending through aligned openings 44, 46 and 48, 50 in the end and side frame members and abutting ridge segments 52, 54 respectively, all as illustrated in FIGS. 1, 2, and 3.

It will be observed from FIG. 4 that the depth or lateral extent of elongated strip formations 24, 26 is selected such that it substantially corresponds to the separation between the flanges 36 and 38 of structural members or channels 22.

Certain liquid epoxy adhesives, specified for example as appropriate for bonding top and bottom sheets or skins of a pallet to a core such as end grain balsa or as mentioned in U.S. Pat. No. 4,304,376, will require that a number of steps be taken in order to ensure that the properties of such bonding materials are fully realized. This approach requires cleaning and etching of the surfaces of the sheets or skins and the surfaces of the core to be bonded to the sheets or skins, mixing of the adhesive followed by the final application of same to the sheets or skins and the core surfaces and maintaining that precise relationship during the application of compressive loads to cure and set the adhesive.

High bond acrylic pressure sensitive adhesives in the form of tapes are now available, such as type no. Y-4945 marketed by Minnesota Mining and Manufacturing Co. Ltd. which tape has a tensile strength normal to the surface to which it is attached of 100 pounds per square inch and a peel strength at 180° F. of 13.8 pounds per inch of width based upon U.S. Federal Specification 147.

The only preparation required prior to attaching such foam type tape number Y-4945 is that the contact surfaces of structural sheets or skins 12, 14 and of flanges 36, 38 of structural members or channels 22 be cleaned with triclorethylene.

Tape sections 60 derived from tape Y4945 are provided with a suitable backing, not illustrated. When appropriately cut to length and the backing removed from one side, tape sections 60 can be readily applied to all exposed and cleaned or degreased outer flange surfaces 56, 58 of flange formations 36, 38.

The backings on the other or exposed side of each tape section 60 so applied to outer surfaces 56, 58 of flange formations 36, 38 are not removed until such time as the sheets or skins 12, 14 are ready for attachment thereto.

FABRICATION

According to the invention suitable material is selected for fabrication of the central core 20 preferably metal stripping of aluminum, aluminum alloys or other acceptable material.

The channel-shaped configuration of elongated structural members 22 can be applied to a metal strip by a bending operation using a suitable jig and press or drawn through a suitable die and severed into appropriate selected lengths.

The corrugated configuration of longitudinally extending strip formations 24, 26 can be applied by a bending operation using a suitable jig to a metal strip and severed into appropriate selected lengths.

The channel-shaped lengths are then disposed in a layout to serve as structural members 22 of the central core 20.

Appropriate severed corrugated lengths have their terminal ends 62, 64 further bent or formed to present abutment surfaces to side frames 16a, 16b of the perimetral frame 15.

Side frame members 16a, 16b and end frame members 18a, 18b of frame 15 are severed from a suitable extrusion of aluminum or aluminum alloy in the preferred embodiment with the ends thereof appropriately mitred.

Side frame members 16a, 16b as well as terminal ends 62, 64 of strip formations 24, 26 are drilled as at 48 and 50 for the reception of the blind rivets 42.

Likewise, end frame members 18a, 18b as well as abutting ridge segments 24, 26 are appropriately drilled as at 44 and 46 for the reception of blind rivets 40.

With the several components of the central core 20 assembled in the layout indicated by the exploded view of FIG. 1, ridge segments 24 and 26 can be secured to the respective webs 32 of elongated structural members 22 by staples 34 as earlier described by using suitable portable air-driven stapling guns, staples 34 being driven through the three layered interfaces of webs 32 and ridge segments 28, 30 in their regions of abutment and clinched to provide a unitary structure.

Frame members 16a, 16b and 18a, 18b are then positioned at the periphery of core 20 therein and by means of blind rivets 40, 42 passing through the respective drilled openings 44, 48 thereof and openings 46, 50 in corrugated strip formations 24, 26 and riveting steps undertaken to secure those components against separation.

Appropriate lengths of tape sections 60 are then severed for application to the core flange surfaces 56, 58. Prior to affixing such tape sections 60, the surfaces of the components which are to be adhered are treated with a degreasing agent, triclorethylene in the case of 3M Y-4945 according to the preferred embodiment.

Following cleansing and degreasing of the bonding surfaces the severed lengths of designated tape 60 are applied to all exposed flange surfaces 56, 58 and to sills 66a, 66b and 68a, 68b of side and end frame members 16a, 16b and 18a, 18b by removing only one strip backing therefrom and leaving the other exposed strip backing on the strips.

The exposed strip backings or liners of the applied sections of tape 60 presented by the surfaces 56 of one side of core 20 are then removed and one exterior sheet or skin 12 or 14 disposed precisely upon core 20 and such sheet or skin riveted as at 70 at spaced intervals to sills 66a, 68a.

The partly fabricated structure is then inverted and the same procedure followed in securing the other sheet or skin 12 or 14 to core 20 with the backing of the sections of tape 60 on the opposed flange surface 58 then removed, the remaining sheet or skin then precisely deposited upon core 20 and riveted as at 72 to opposed sills 66b, 68b of side and end frame members.

The composite sandwich structure 10 so fabricated is then inserted within an appropriate collapsible vacuum bag of the character that can be evacuated by a vacuum pump wherein such structure is subjected to atmospheric pressure drawing overlying sheets or skins 12, 14 against the strip sections 60 presented by the outer surfaces 56, 58 of the core flanges 36, 38 and sills 66a, 66b, 68a and 68b of the frame 15 ensuring that appropriate pressure is uniformly applied to achieve the requisite bond.

It is important that sheets or skins 12 and 14 be precisely positioned before being brought into registration upon the sills 66a, 66b, 68a and 68b and core flange surfaces 56, 58 for once contact has been made the degree of adhesion exhibited by tape sections 60 makes it extremely difficult to remove or to reposition them.

The increased affinity of selected adhesive 3M Y4945 provided in strip form to bond or adhere to metal surfaces substantially increases the resistance to shear forces under loading thereby substantially lessening the likelihood of delamination of the sheets or skins 12, 14 occurring in the field.

Where concentrated loads have been applied to the commposite sandwich structure 10 embodying the invention and a local area on the face of the structure crushed, deformed or punctured the unit can be repaired simply by cutting away the damaged portion and introducing by splicing substitute components into the existing structure.

The further steps taken in repair of such structure will follow generally the steps outlined in the fabrication of the unit with the application of appropriate adhesive strips 60 to the substitute flange surfaces, the adherence of the overlying plate or skin portion followed by the introduciton of the repaired unit into a vacuum bag to apply the requisite pressure.

While the preferred embodiment of this invention has been described and illustrated, modifications, variations or alternatives may be introduced or undertaken in the structures disclosed without departing from the spirit or scope of the invention as defined by the appended claims.

What I claim is:

1. In a core for composite structure wherein spaced apart opposed structural sheets are to be joind together against separation by a central core, said core including the combination of at least a pair of non-abutting spaced apart flanged elongated structural members interconnected therealong by a longitudinally extending corrugated strip formation extending intermediately therebetween each said structural members including a central web portion and opposed longitudinally extending flange formations for presentation and connection to each of said spaced apart structural sheets, said corrugated strip formation including alternate ridge segments presented to said respective web portions of said spaced apart structural members at alternate spaced apart regions therealong and in abutment therewith and means securing said ridge segments to said respective web portions in said alternate spaced apart regions of abutment.

2. A core according to claim 1 wherein said central core includes more than two said spaced apart structural members and at least two said corrugated structural strip formations in which each structural member is interconnected therealong to said next adjacent structural member by one of said corrugated structural strip formations extending intermediately therebetween, and wherein said alternate ridge segments of each next adjacent corrugated strip formation presented to the alternate spaced apart regions of said web portion of said structural member separating same are arranged in opposed aligned relation to thereby establish interfaces of three thicknesses in said latter mentioned regions.

3. A core according to claims 1 or 2 wherein said elongated structural members are channel-shaped.

4. A core according to claims 1 or 2 wherein said longitudinally extending strip formation has a uniformly corrugated configuration.

5. A core according to claim 2 wherein said elongated structural members are channel-shaped and said elongated strip formations have a uniformly corrugated configuration.

6. A core according to claim 5 wherein the lateral extent of said longitudinally extending corrugated strip formations substantially correspond to the separation between said flange formations of said elongated channel-shaped structural members.

7. A core according to claim 2 wherein said elongated structural members and said longitudinally extending strip formations are fabricated from a metal or alloy and said means securing said elongated structural members to said longitudinally extending strip formations comprise metal staples.

8. A core according to claim 7 wherein said elongated structural members are fabricated from aluminum or an alloy thereof and said staples are derived from steel or other suitable alloy.

9. A hollow core for a composite structure wherein spaced apart opposed structural sheets are to be joined together against separation, said core including a plurality of spaced apart elongated non-abutting flanged structural members interconnected by a plurality of longitudinally extending corrugated strip formations disposed intermediately therebetween, said structural members having a central web portion and presenting spaced apart opposed longitudinally extending flange formations to thereby define a channelshaped configuration, each said longitudinally extending corrugated strip formation presenting alternate ridge segments thereof to said respective web portions of adjacent structural members at alternate spaced apart regions therealong and in abutting relation thereto and with said alternate ridge segments of each next adjacent corrugated strip formation arranged in opposed aligned relation to thereby establish interfaces of three thicknesses in said regions of abutment and means securing said alternate spaced apart structural members and said opposed aligned alternate ridge segments of said corrugated strip formations together in said regions of abutment.

10. A hollow core according to claim 9 wherein the lateral extent of said longitudinally extending corrugated strip formation substantially corresponds to the separation between said flange formations of said elongated channel-shaped structural members.

11. A hollow core according to claim 9 or 10 wherein said elongated structural members and said longitudinally extending strip formations are fabricated from a metal or alloy and said means securing said elongated structural channel-shaped members to said longitudinally extending corrugated strip formations comprise a metal staple in said regions of abutment.

12. A hollow core structure according to claims 9 or 10 wherein said elongated structural members are fabricated from aluminum or an alloy thereof and said staples are derived from steel or other suitable alloy.

13. In a composite structure wherein opposed spaced apart structural sheets are joined together against separation by a central core, said central core including more than two spaced apart substantially parallel like non-abutting flanged structural members each interconnected therealong respectively to the next adjacent structural member by substantially uniformly corrugated like structural strip formations extending intermediately therebetween, each said structural member including a central web portion and opposed longitudinally extending flange formations presented to said spaced apart structural sheets and each said corrugated strip formation including alternate ridge segments presented to said web portions of said respective spaced apart structural members at alternate spaced apart regions therealong, and with said alternate ridge segments of each next adjacent corrugated strip formation presented to the alternate spaced apart regions of said web portion separating same arranged in opposed aligned relation to establish interfaces of three thicknesses in such regions, means securing said ridge segments to said respective web portions at said alternate spaced apart regions therealong and means securing said opposed longitudinally extending flange formations to said respective spaced apart opposed structural sheets.

14. A composite structure according to claim 13 wherein said structural members are channel-shaped.

15. A structure according to claim 14 wherein the lateral extent of said corrugated strip formation substantially corresponds to the separation between said flange formation of said channel-shaped structural members.

16. A composite structure according to claim 13 wherein said structural members and said corrugated strip formation are fabricated from a metal or alloy and said means securing said structural members to said corrugated strip formations comprise metal staples.

17. A composite structure according to claim 13 wherein said structural members are fabricated from aluminum or an alloy thereof, said means securing said structural members to said corrugated strip formations comprises staples derived from steel or other suitable alloy.

18. A composite structure according to claim 13 or 17 wherein said means securing said opposed longitudinally extending flange formations to said respective spaced apart opposed structural sheets comprises adhesive strip means extending between said structural sheets and said respective flange formations presented thereto to bond same together against separation.

19. A composite structure according to claim 13 wherein a plurality of frame members extend between said spaced apart opposed structural sheets and in abutting relation to said central core peripherally thereof to enclose same and means securing said frame members to said central core and to said sheets respectively.

20. A composite structure according to claim 19 wherein said plurality of frame members presents sill formations to each of said spaced apart opposed structural sheets and wherein adhesive strip means extend between said sheets and said respective sill formations of said frame members to bond same together against separation.

* * * * *